United States Patent [19]

Templeton

[11] 3,827,705

[45] Aug. 6, 1974

[54] TRICYCLE DRIVE TRAIN

[76] Inventor: Raymond E. Templeton, 11144 Kolina Ln., Sun City, Ariz. 85351

[22] Filed: Dec. 11, 1972

[21] Appl. No.: 313,987

[52] U.S. Cl. .............................. 280/7.15, 280/261
[51] Int. Cl. ............................................ B62k 13/04
[58] Field of Search ................. 280/261, 7.15, 7.16; 180/27

[56] References Cited
UNITED STATES PATENTS

| | | | |
|---|---|---|---|
| 2,443,723 | 6/1948 | Carroll | 180/27 |
| 3,258,273 | 6/1966 | Matthews | 280/7.15 |
| 3,368,823 | 2/1968 | Templeton | 280/261 |
| 3,403,927 | 10/1968 | Rettger, Jr. | 280/261 |
| 3,466,059 | 9/1969 | Kiernan | 280/261 |
| 3,512,599 | 5/1970 | Hott et al. | 180/27 |

*Primary Examiner*—Robert J. Spar
*Assistant Examiner*—Ross Weaver
*Attorney, Agent, or Firm*—William H. Drummond

[57] ABSTRACT

An improved drive train is provided for a tricycle having a front steering wheel and two rear driven wheels, the tricycle including a pedal crank for generating motive power and a drive train for transferring the motive power from the pedal crank to the driven wheels. The improvement comprises in cooperative combination a differential gear for applying motive power equally to each of said driven wheels and coaster brake means for selectively transmitting the motive power to the driven wheels.

In one embodiment, the motive power from the pedal crank is transmitted directly through a chain-sprocket combination to a single conventional bicycle coaster brake. The motive power is then selectively transmitted from the coaster brake to a differential gear assembly which, in turn, drives a pair of rear axles having conventional front bicycle wheels directly attached to the outer ends thereof.

In another embodiment, power from the pedal crank is transmitted through a chain-sprocket assembly directly to a differential gear assembly which drives a pair of power transmission shafts having sprocket gears mounted on the outer ends thereof. Motive power is transmitted from each of the shaft-mounted sprockets through a drive-chain to a coaster brake assembled integrally in a conventional rear bicycle wheel.

1 Claim, 6 Drawing Figures

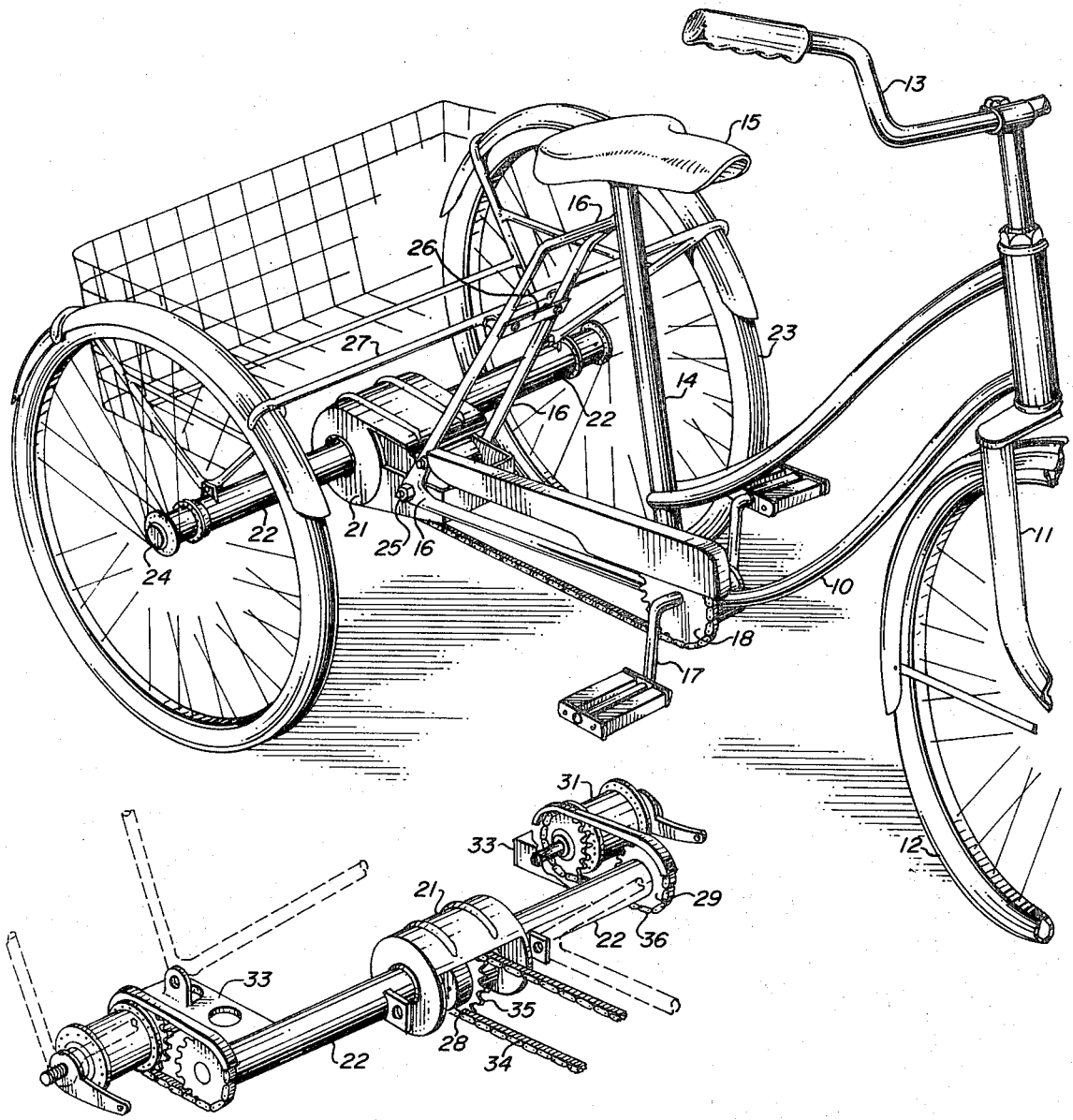

PATENTED AUG 6 1974

TRICYCLE DRIVE TRAIN

This invention relates to an improved drive train for a tricycle having a front steering wheel and two rear driven wheels.

In another respect, the invention relates to an improved tricycle drive train which permits even application of braking or motive power to the driven wheels and which also permits free-wheeling operation of the tricycle.

In still another respect, the invention relates to a tricycle drive train utilizing a single coaster brake in combination with a differential drive to evenly apply motive or braking power to the driven wheels and which also permits free-wheeling operation of the tricycle.

In yet another respect, the invention relates to an improved bicycle drive train utilizing a pair of conventional coaster brakes, each assembled integrally in a conventional driven rear bicycle wheel, to apply motive or braking force transmitted to the coaster brakes through a differential drive and which also permits free-wheeling operation of the tricycle.

In another important respect, the invention relates to apparatus for converting a conventional bicycle to a tricycle having a front steering wheel and two rear driven wheels and which includes the improved drive train mentioned above.

The prior art discloses various expedients for applying motive power to the driven wheel or wheels of a tricycle. According to certain prior art tricycles, motive power from the pedal crank is transmitted via a chain-sprocket drive to a differential gear assembly which transmits the motive power evenly to the separate driving wheels even though the wheels are turning at a different rotational speed. According to certain other prior art, the motive power from the crank is transmitted via a chain-sprocket drive to the inner end of one of a pair of rear axles, thus applying motive power to only one of the rear wheels. The other rear wheel is not driven but merely free-wheels. The prior art also contemplates the combination of one or more coaster brakes in a tricycle drive train to permit complete free-wheeling when neither motive power nor braking power is applied to the pedal crank.

The prior art tricycle drive systems have several important disadvantages, depending on the exact configuration. For example, prior tricycle drive systems employing a differential drive failed to provide the braking and free-wheeling functions available in drive trains which include a coaster brake. Conversely, prior tricycle drive trains which included a coaster brake applied the motive power to only one of the rear wheels. This caused practical operational problems such as undesirable directional stability, steering and handling problems, reduced braking performance and uneven tire wear. These undesirable characteristics of prior art bicycle drive systems were amplified with the more recent advent of kits for converting conventional bicycles to a tricycle configuration since such kits could only be commercially attractive if they provided for quick convenient conversion of the bicycle to a tricycle configuration by persons of limited mechanical skill, using only conventional hand tools.

Therefore, it would be highly desirable to provide an improved tricycle drive train system which includes both a differential drive to evenly transmit motive or braking power to both rear wheels and which also includes a coaster brake in the drive train to provide driving, free-wheeling and braking action. It would be particularly desirable to provide such functions in an adapter kit for converting a conventional bicycle to a tricycle configuration.

Accordingly, the principal object of the invention is to provide an improved tricycle drive train system.

Another principal object of the invention is to provide an improved tricycle drive train which provides both the differential drive and coaster brake functions.

It is a further and more specific object of the invention to provide an improved adapter kit for converting a conventional bicycle to a tricycle configuration having a drive train system which provides both coaster brake and differential drive functions.

It is a still further and more specific object of the invention to provide an adapter kit of the type described which is of simplified, rugged and economical construction and which can be rapidly installed on a conventional bicycle by persons of ordinary or even limited mechanical skill, using simple, readily available hand tools.

These and other objects and advantages of the invention will be apparent to those skilled in the art from the following detailed description thereof, taken in conjunction with the drawings, in which:

FIG. 1 is a perspective view of a tricycle having a drive train constructed in accordance with one presently preferred embodiment of the invention;

FIG. 2 is a perspective view of a drive train constructed in accordance with a second presently preferred embodiment of the invention with the other parts of the tricycle of FIG. 1 omitted for clarity of illustration;

Figure 3:
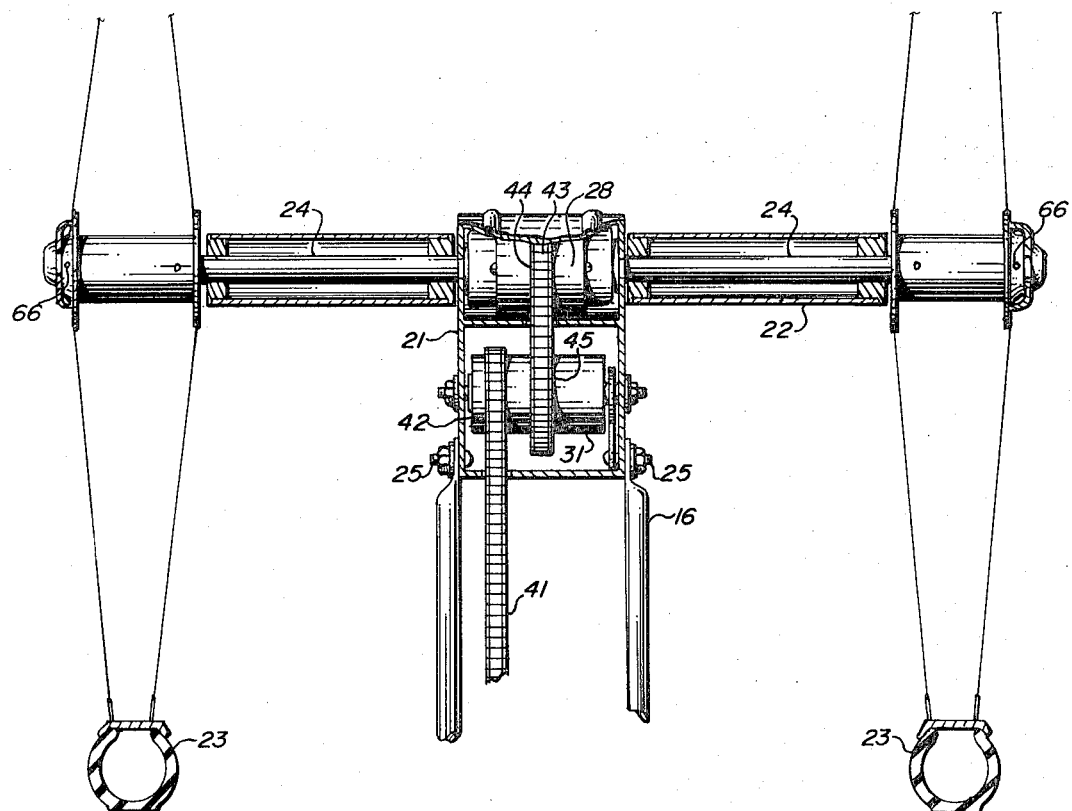
FIG. 3 is a partially cut-away plan view of the drive train system of the tricycle of FIG. 1.

Briefly, in accordance with the invention, I provide an improved drive train for a tricycle having a front steering wheel and two rear driven wheels. The tricycle is of generally conventional construction and includes pedal crank means for generating motive power and drive train means for transferring the motive power from the pedal crank to the driven wheels. The improvement, in accordance with the invention, comprises, in operative combination in the drive train, differential gear means for applying the motive power equally to each of the driven wheels and coaster brake means for selectively transmitting the motive power to the driven wheels.

According to one presently preferred embodiment of the invention, the improved drive train combination includes a central housing member, two rear-axle housing members extending laterally from the central housing, a rear axle half-shaft journalled in each of the laterally extending axle housings with the inner ends of the half-shafts extending inwardly of the central housing, differential gear means disposed in the central housing in operative connection with the inner ends of the half-shafts, a coaster brake carried by the central housing forwardly from the differential gear, and chain-sprocket means for transmitting motive power from the pedal crank to the coaster brake and from the coaster brake to the differential.

According to a second presently preferred embodiment of the invention, the improved tricycle drive train combination includes a central housing member, two drive shaft housing members extending laterally therefrom, a drive shaft journalled in each of said drive shaft housing members with the inner ends thereof extending inwardly of the central housing, differential gear means disposed in the central housing in operative connection with the inner ends of the drive shafts, a pair of conventional rear bicycle wheels each having an integral coaster brake, the wheels being spaced apart on either side of the central housing, and chain-sprocket means for transmitting motive power from the pedal crank to the differential gear and from the outer ends of the drive shafts to each of the coaster brakes.

Turning now to the drawings, in which the presently preferred embodiments of the invention are shown for purposes of illustration, FIG. 1 depicts a conventional bicycle modified by the installation of an adapter kit to convert it to a tricycle having the improved drive train according to a first presently preferred embodiment of the invention. The tricycle consists of certain components of a conventional bicycle including the frame 10, the front steering fork 11, front wheel 12, handlebars 13, upright frame member 14, seat 15, rear wheel fork 16 and the usual assembly of pedal crank 17 and drive sprocket 18. The adapter kit consists of a central housing member 21 which encloses the coaster brake and differential drive gear assembly illustrated in subsequent drawings, rear axle housing members 22 extending laterally therefrom, and conventional front bicycle wheels 23 mounted on the outer ends 24 of rear axle half-shafts journalled in each of the housing members 22 and extending into the central housing 21. The adapter kit assembly illustrated in FIG. 1 is conveniently employed to convert a standard bicycle to a tricycle configuration by removing the standard rear bicycle wheel and attaching the central housing 21 to the lower end of the rear wheel fork 16 by means of bolts 25 and by means of a bracket 26 which affixes a lateral bracing member 27 to the upper portion of the rear fork 16.

The general arrangement of various elements of the improved tricycle drive train according to a second preferred embodiment of the invention is illustrated in FIG. 2 and includes a central housing member 21 which encloses the differential drive gear assembly 28. Drive shaft housing members 22 extend laterally from the central housing 21. Drive shaft sprockets 29 are fixed to the outer ends 30 of drive shafts (not shown) which are journalled in the housings 22 and which extend inwardly of the housing 21 for connection with the differential drive gear assembly 28, as further illustrated in subsequent views. Conventional rear bicycle wheels (not shown) having integral coaster brake assemblies 31 are mounted on stub axles 32 carried by rearwardly extending brackets 33 fixed to the outer ends of the drive shaft housings 22. Motive power from the conventional bicycle pedal crank sprocket 18 is transmitted by means of the drive chain 34 and sprocket 35 of the differential drive gear assembly 28 and by the drive shafts 30, drive shaft sprockets 29, and chains 36 to the sprocket of the coaster brakes 31.

Figure 4:
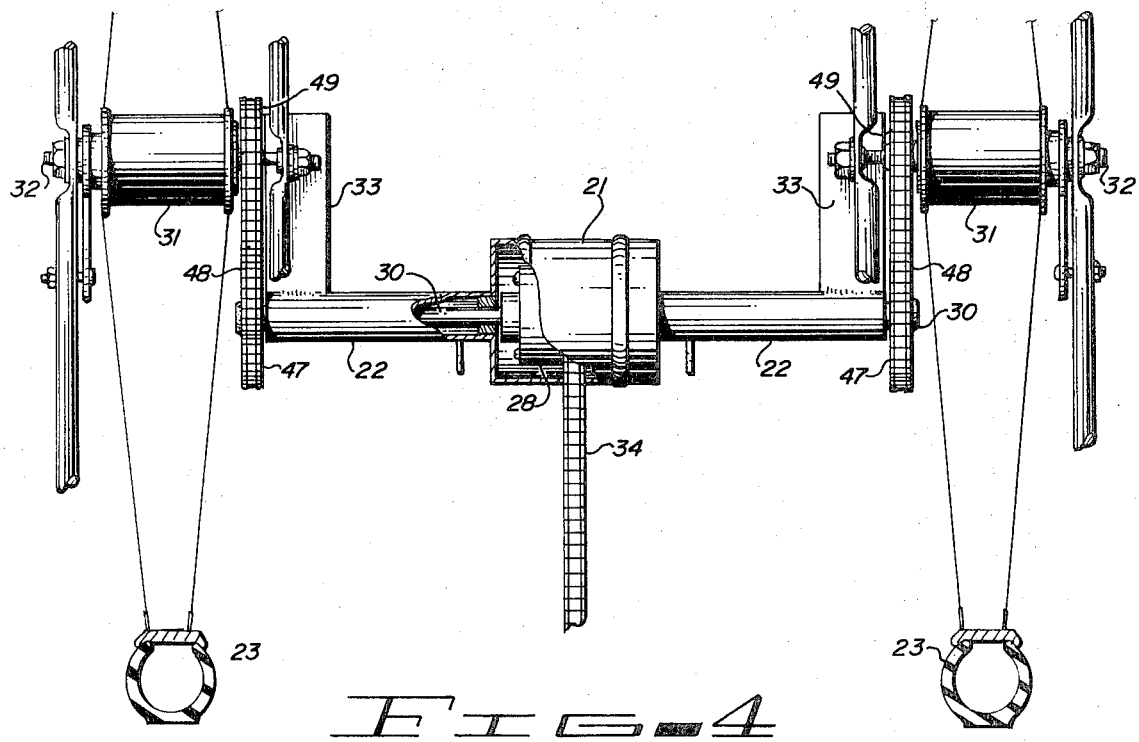
FIG. 4 is a partially cut-away plan view of the drive train system of FIG. 2.

The two presently preferred embodiments of the invention are further illustrated in partially sectionalized plan views in FIGS. 3 and 4, in which like reference characters denote equivalent elements.

In FIG. 3, illustrating in greater detail the embodiment of FIG. 1, the drive chain 41 engages a sprocket gear 42 formed on the outer periphery of the coaster brake 31 which is journalled in the forward portion of the central housing 21. A secondary drive chain 43 engages sprockets 44 and 45 respectively of the differential apparatus 28 and formed on the outer periphery of the coaster brake 31. Motive power is then transmitted through the half-shaft rear axles 24 journalled in the rear axle housings 22 to the spaced rear wheels 23 carried on the outer ends of the axles 24 and secured thereto by the nuts 46.

As shown in FIG. 4, which illustrates in greater detail the embodiment of FIG. 2, the motive power is transmitted from the pedal crank of the tricycle through the main drive chain 34 to the sprocket of the differential drive gear apparatus 28. Motive power is then transferred via the power transmission shafts 30 journalled in the housings 22 to sprockets 47 carried on and fixed to the outer ends of the power transmission shafts 30. A pair of secondary power transmission chains 48 transmit the motive power from the sprockets 47 to sprockets 49 formed integrally with conventional rear bicycle wheels 23 provided with coaster brake assemblies 31.

Figure 5:
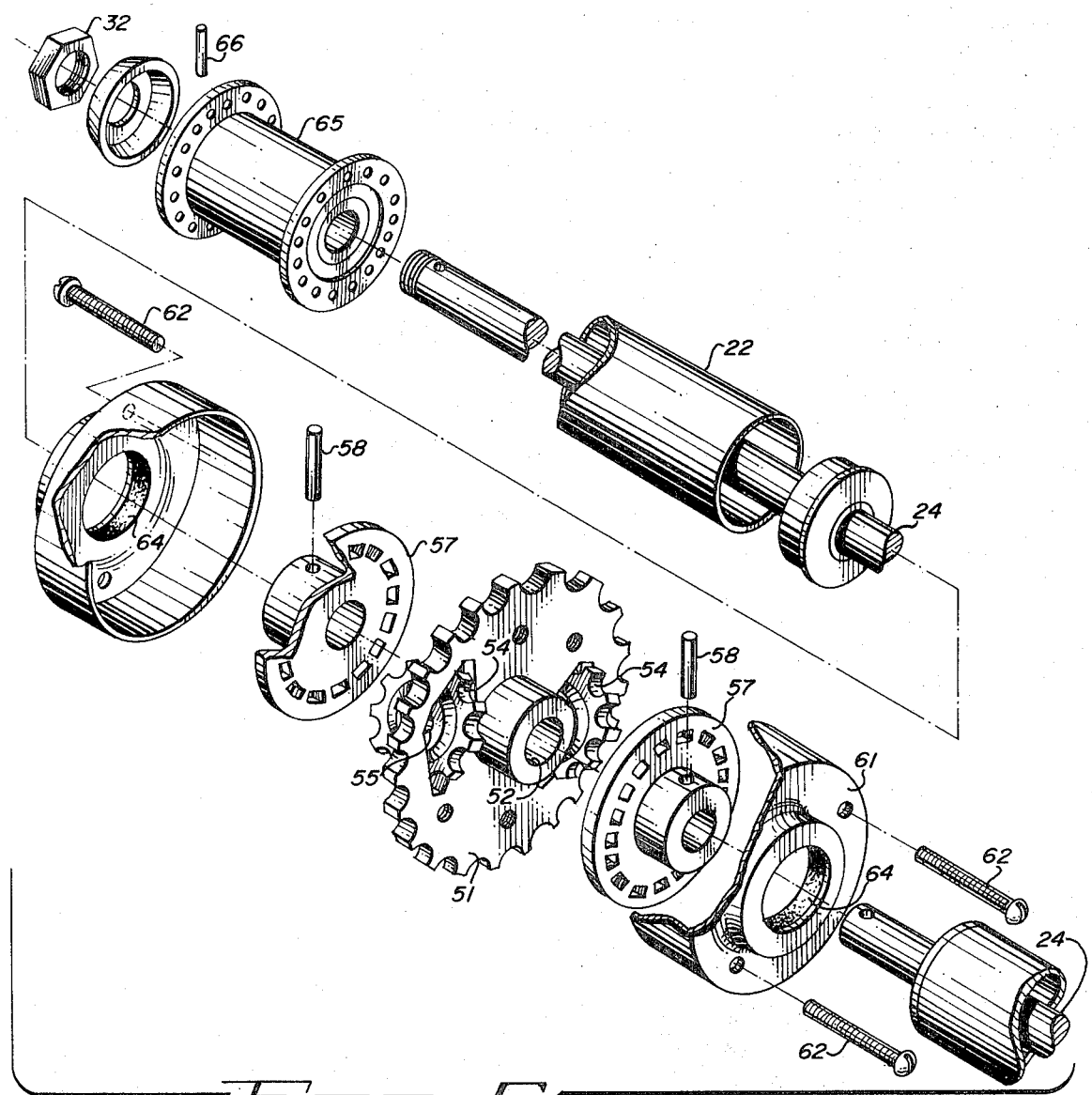
FIG. 5 is an exploded perspective view of the differential drive of the systems of FIGS. 1–4, showing particularly its mode of operative association in the system of FIGS. 1 and 3.
Figure 6:
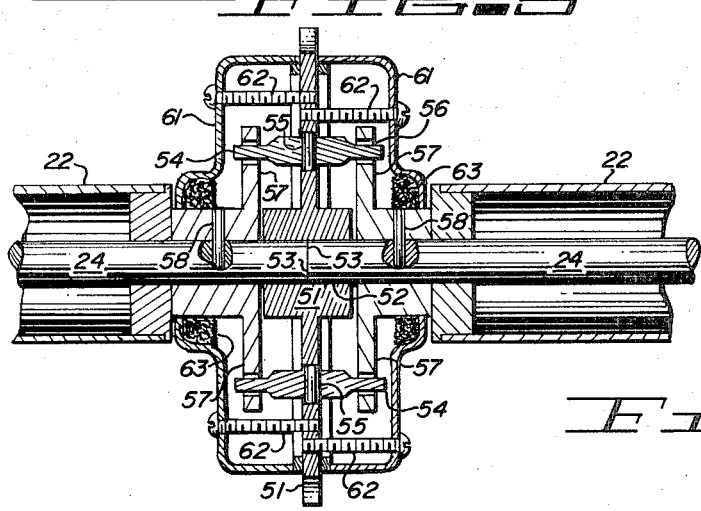
FIG. 6 is a cross-sectional assembly view of the differential drive of FIG. 5.

The details of the differential drive gear assemblies illustrated in FIGS. 1–4 are further amplified in FIGS. 5–6 in which like reference characters represent identical elements. The differential comprises a main driven sprocket gear 51 having a central aperture 52 which receives the inner ends 53 of rear axle shafts 24. Idler gears 54 are carried on shafts 55 journalled in the body of the main sprocket gear 51. The teeth of the idler gears 54 engage in apertures 56 formed in driving gears 57 carried on and fixed to the ends of the rear axle shafts 24 by means of pins 58. The main sprocket gear 51, idler gears 54 and driven gears 57 are enclosed in a housing formed by mating cover members 61 secured to the main sprocket gear 51 by means of bolts 62 so as to form a dust- and dirt-tight enclosure for the differential gear apparatus. Oil seals 63 are provided to seal the axle shaft apertures 64 to retain lubricant within the differential gear housing.

As further illustrated in FIG. 5, the hubs 65 are retained on the outer ends of the rear axle shafts 24 by means of a nut 32 and secured for rotation therewith by a pin 66.

Having described my invention in such a clear and concise manner as to enable those skilled in the art to understand and practice it, and having described the presently preferred embodiments thereof, I claim:

1. A unitary drive train attachment for converting a conventional pedal-powered bicycle to a tricycle having a front steering wheel and two pedal-controlled rear wheels to selectively and evenly provide driving, free-wheeling and braking action at both of said rear wheels in response to pedal action, said attachment comprising:

a. a central housing member adapted to be received between the rear-wheel fork of said bicycle and secured thereto without modification thereof by bolts extending through the fork members in place of the conventional rear-axle stubs;
b. a pair of rear-axle housing members having inner ends thereof secured to and extending laterally from said central housing member;
c. a pair of rear-axle half-shafts, each journaled for rotation within a respective one of said rear-axle housing members, the outer ends of said shafts extending laterally from said housing members and the inner ends thereof extending into said central housing member;
d. substantially enclosed within said central housing member,
  1. coaster brake means journaled in said central housing member, and
  2. differential means for transmitting motive and braking power to said inner ends of said half-shafts;
e. a pair of conventional front bicycle wheels, each carried by and fixed to said outer ends of said half-shafts for rotation therewith; and
f. drive chain - sprocket means for transmitting motive and braking power from the pedal crank of said bicycle to said coaster brake means and from said coaster brake means to said differential means, said elements constituting a unitary drive train attachment for converting a bicycle to a tricycle by attaching said housing to said rear fork.

* * * * *